United States Patent
Koga et al.

(10) Patent No.: US 12,217,460 B2
(45) Date of Patent: Feb. 4, 2025

(54) CAMERA DEVICE AND IMAGE PROCESSING METHOD

(71) Applicant: i-PRO Co., Ltd., Fukuoka (JP)

(72) Inventors: Masashi Koga, Fukuoka (JP); Takeshi Shimada, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 375 days.

(21) Appl. No.: 17/749,962

(22) Filed: May 20, 2022

(65) Prior Publication Data
US 2022/0375131 A1 Nov. 24, 2022

(30) Foreign Application Priority Data
May 21, 2021 (JP) .................................. 2021-086383

(51) Int. Cl.
*G06T 7/73* (2017.01)
*G06T 7/90* (2017.01)

(52) U.S. Cl.
CPC ...... *G06T 7/90* (2017.01); *G06T 2207/20004* (2013.01); *G06T 2207/20081* (2013.01); *G06T 2207/20132* (2013.01); *G06T 2207/30196* (2013.01); *G06T 2207/30232* (2013.01)

(58) Field of Classification Search
CPC ......... G06T 7/70; G06T 15/205; G06T 15/04; G06V 20/58; G06Q 10/063118; G05B 19/41885; G05B 19/4188; A61B 5/0059; A61B 1/043
See application file for complete search history.

(56) References Cited

U.S. PATENT DOCUMENTS

2023/0025209 A1* 1/2023 Binder .................... B60R 1/27

FOREIGN PATENT DOCUMENTS

JP 2013-098726 5/2013

* cited by examiner

*Primary Examiner* — Phuoc H Doan
(74) *Attorney, Agent, or Firm* — Greenblum & Bernstein, P.L.C.

(57) ABSTRACT

A camera device includes an imaging unit for capturing an image of an imaging area in which a subject is present, a memory for storing a camera parameter related to imaging, a detection unit for detecting the subject from the captured image, a first determination unit for primarily determining a color of a target portion of the detected subject, a second determination unit for adjusting a determination result of a predetermined color corresponding to the target portion determined by the first determination unit based on the camera parameter, when the color of the target portion determined by the first determination unit is the predetermined color having a plurality of gradations, and a communication unit for transmitting an adjustment result of the predetermined color corresponding to the determined target portion and information on the target portion to an external device in association with each other.

9 Claims, 8 Drawing Sheets

HDR off

|  | Black | Gray | White |
|---|---|---|---|
| Black | 1 | 0 | 0 |
| Gray6 | 0.5 | 0.5 | 0 |
| Gray5 | 0 | 1 | 0 |
| Gray4 | 0 | 1 | 0 |
| Gray3 | 0 | 1 | 0 |
| Gray2 | 0 | 1 | 0 |
| Gray1 | 0 | 0.5 | 0.5 |
| White | 0 | 0 | 1 |

*FIG. 5B*

HDR on EXPOSURE RATIO SMALL

|  | Black | Gray | White |
|---|---|---|---|
| Black | 1 | 0 | 0 |
| Gray6 | 1 | 0 | 0 |
| Gray5 | 0.3 | 0.7 | 0 |
| Gray4 | 0 | 1 | 0 |
| Gray3 | 0 | 1 | 0 |
| Gray2 | 0 | 1 | 0 |
| Gray1 | 0 | 0.5 | 0.5 |
| White | 0 | 0 | 1 |

FIG. 5C

HDR on EXPOSURE RATIO MEDIUM

|       | Black | Gray | White |
|-------|-------|------|-------|
| Black | 1     | 0    | 0     |
| Gray6 | 1     | 0    | 0     |
| Gray5 | 0.5   | 0.5  | 0     |
| Gray4 | 0     | 1    | 0     |
| Gray3 | 0     | 1    | 0     |
| Gray2 | 0     | 0.5  | 0.5   |
| Gray1 | 0     | 0    | 1     |
| White | 0     | 0    | 1     |

FIG. 5D

HDR on EXPOSURE RATIO LARGE

|       | Black | Gray | White |
|-------|-------|------|-------|
| Black | 1     | 0    | 0     |
| Gray6 | 1     | 0    | 0     |
| Gray5 | 0.5   | 0.5  | 0     |
| Gray4 | 0     | 1    | 0     |
| Gray3 | 0     | 0.7  | 0.3   |
| Gray2 | 0     | 0    | 1     |
| Gray1 | 0     | 0    | 1     |
| White | 0     | 0    | 1     |

CAMERA DEVICE AND IMAGE PROCESSING METHOD

CROSS-REFERENCE TO RELATED APPLICATIONS

This application is based on and claims priority under 35 USC 119 from Japanese Patent Application No. 2021-086383 filed on May 21, 2021, the contents of which are incorporated herein by reference.

TECHNICAL FIELD

The present disclosure relates to a camera device and an image processing method.

BACKGROUND ART

Patent Literature 1 discloses an intercom device with a camera including a front door slave unit having a camera for capturing an image of a visitor and a function of calling a resident to make a call, and a room master unit having a monitor for displaying a captured video of the camera and a function of responding to the call from the front door slave unit. The intercom device with the camera creates a luminance histogram from luminance information of the captured video of the camera, compares reference luminance data stored in advance with the luminance histogram to determine whether an imaging state is a backlight state or a low illuminance state, and performs backlight correction and low illuminance correction to generate an image. In particular, the intercom device with the camera generates a corrected tone curve by performing, as backlight correction, correction for increasing the luminance of a pixel having low luminance by a predetermined amount to approach intermediate luminance, changing the luminance histogram by performing luminance compression for performing correction for decreasing the luminance of a pixel having high luminance by a predetermined amount to approach the intermediate luminance, and performing contrast enhancement for performing correction for further darkening a dark area and further brightening a bright area with reference to a predetermined intermediate illuminance.

CITATION LIST

Patent Literature

Patent Literature 1: JP-A-2013-98726

SUMMARY OF INVENTION

Although a position of a subject (for example, a visitor) imaged by the intercom device with the camera in Patent Literature 1 tends to be a fixed position in the captured video, the following problem arises when the technique in Patent Literature 1 is applied to the backlight correction performed by the camera device (for example, a monitoring camera) installed in a town or the like. Specifically, various types of subjects (for example, male, female, child, elderly, and vehicle) actually appear in an angle of view of the camera device installed in the town or the like. Therefore, by uniformly changing the luminance histogram or performing contrast enhancement on the entire one imaged video as in Patent Literature 1, a subject whose luminance does not originally need to be changed or whose contrast does not need to be enhanced is also affected by the change, and thus visibility of the captured video may be deteriorated.

In addition, a high dynamic range (HDR) function is known as a technique for improving the visibility of both a bright place (for example, an outdoor background object) and a dark place (for example, a subject such as an indoor person) of a video displayed on a monitor even in a place where a difference in brightness is large. A camera device capable of using the HDR function has recently appeared, whereas in a camera device capable of using the HDR function, a color on a captured image may become a color different from an actual color depending on a setting of an image quality parameter of the camera device. For example, when two captured images captured in a backlight state (that is, a captured image in which a bright subject is captured and a captured image in which a dark subject is captured) are synthesized by the HDR function, the original white subject may be processed to have a light gray color, or the original black subject may be subjected to white floating.

The present disclosure has been made in view of the above-described related-art circumstances. An object of the present disclosure is to provide a camera device and an image processing method capable of adaptively adjusting determination processing of a color of a subject on a captured image in accordance with setting of an image quality parameter and improving extraction accuracy of attribute information related to the color of the subject on the captured image.

The present disclosure provides a camera device including: an imaging unit configured to capture an image of an imaging area in which a subject is present; a memory configured to store a camera parameter related to imaging; a detection unit configured to detect the subject from a captured image captured by the imaging unit; a first determination unit configured to primarily determine a color of a target portion of the subject detected by the detection unit; a second determination unit configured to adjust a determination result of a predetermined color corresponding to the target portion determined by the first determination unit, based on the camera parameter related to the imaging, when the color of the target portion determined by the first determination unit is the predetermined color having a plurality of gradations; and a communication unit configured to transmit an adjustment result of the predetermined color corresponding to the target portion determined by the second determination unit and information on the target portion to an external device in association with each other.

Further, the present disclosure provides an image processing method executed by a camera device communicably connected to an external device. The image processing method includes the steps of capturing an image of an imaging area in which a subject is present; a step of detecting the subject from a captured image; primarily determining a color of a target portion of the detected subject; adjusting a determination result of a predetermined color corresponding to the determined target portion based on a camera parameter related to imaging when the determined color of the target portion is the predetermined color having a plurality of gradations; and transmitting an adjustment result of the predetermined color corresponding to the determined target portion and information on the target portion to the external device in association with each other.

It should be noted that these comprehensive or specific aspects may be achieved by a system, a device, a method, an integrated circuit, a computer program, or a recording medium, or may be achieved by any combination of a system, a device, a method, an integrated circuit, a computer program, and a recording medium.

According to the present disclosure, it is possible to adaptively adjust the determination processing of the color of the subject on the captured image in accordance with the setting of the image quality parameter, and it is possible to improve the extraction accuracy of the attribute information related to the color of the subject on the captured image.

Further, advantages and effects of an aspect of the present invention will become apparent from the specification and the drawings. These advantages and/or effects are provided by features described in several embodiments and the specification and drawings, and it is not necessary to provide all the features in the embodiments and the specification and drawings to obtain one or more identical features.

BRIEF DESCRIPTION OF DRAWINGS

FIG. 7B is a diagram showing an example of the temporal change in the image sensor output when the HDR function is on.

DESCRIPTION OF EMBODIMENTS

Background of First Embodiment

Figure 7A:
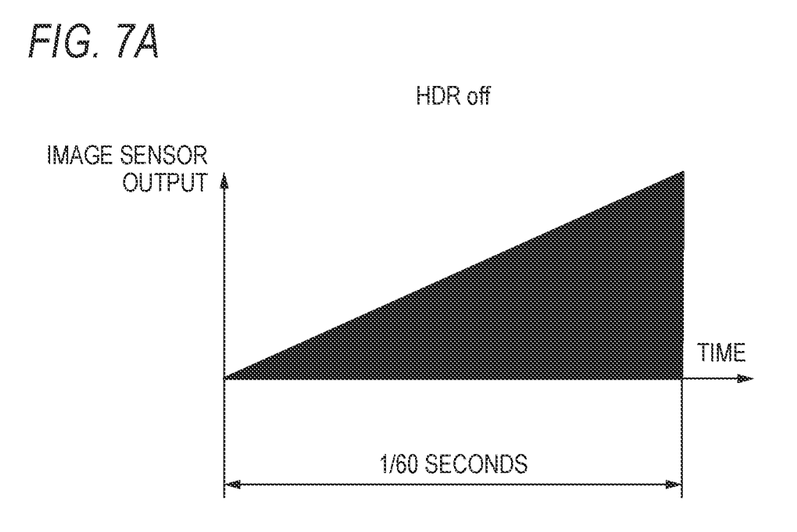
FIG. 7A is a diagram showing an example of a temporal change in an image sensor output when the HDR function is off or the HDR function is not originally provided.
Figure 7B:
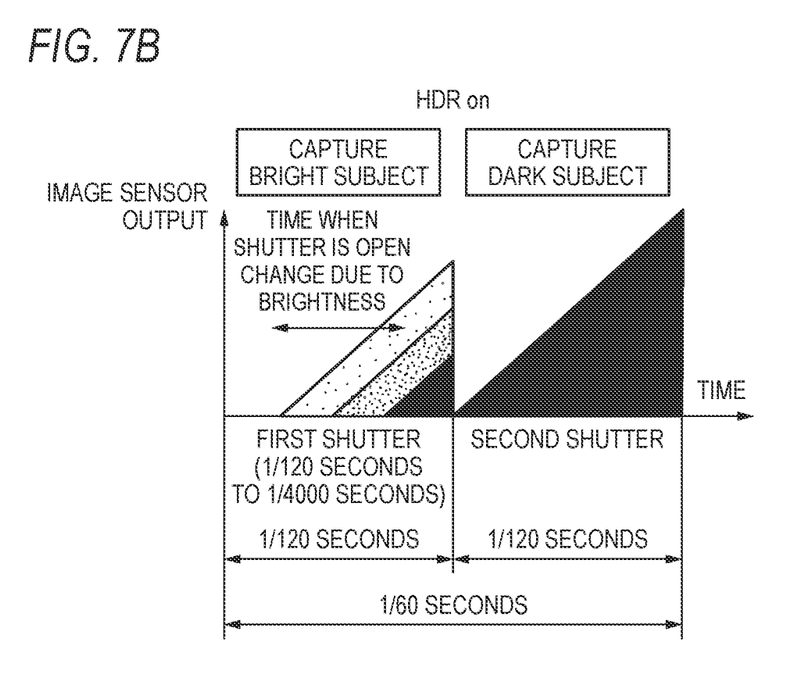

First, a problem when a HDR function provided in a camera device in the related art is on will be described with reference to FIGS. 7A and 7B. FIG. 7A is a diagram showing an example of a temporal change in an image sensor output when the HDR function is off or the HDR function is not originally provided. FIG. 7B is a diagram showing an example of the temporal change in the image sensor output when the HDR function is on. In FIGS. 7A and 7B, a horizontal axis represents time, and a vertical axis represents the image sensor output included in the camera device.

For example, a frame rate of the camera device is set to 60 fps. That is, when the provided HDR function is off or the HDR function is not originally provided, the camera device generates one captured image of a subject by turning off a shutter every $1/60$ seconds (see FIG. 7A).

On the other hand, when the camera device is provided with the HDR function and is on, the shutter is turned off every $1/120$ seconds in order to capture (image) each of a bright subject and a dark subject, and two captured images are generated within a time period in which the camera device not provided with the HDR function generates one captured image (see FIG. 7B).

In FIG. 7B, the camera device captures an image at an optimum shutter speed for the bright subject by opening a first shutter. The shutter speed is, for example, in a range of $1/120$ seconds to $1/4000$ seconds according to brightness of the subject. In this case, on the captured image captured corresponding to the first shutter speed, the bright subject is clearly projected, whereas the dark subject is blackened out.

Next, the camera device captures an image at an optimum shutter speed for the dark subject by opening a second shutter. Since an exposure time for capturing the image of the dark subject is longer than the exposure time for capturing the image of the bright subject (see FIG. 7B), the bright subject flies white (is saturated), whereas the dark subject is clearly projected. The camera device can generate a captured image in which both the bright subject and the dark subject are clearly seen by synthesizing one captured image in which the bright subject is captured and one captured image in which the dark subject is captured.

The camera device having such an HDR function has the following problems.

Specifically, depending on an image quality parameter (for example, an exposure ratio which is a ratio between the exposure time according to imaging of the bright subject and the exposure time according to imaging of the dark subject) set in the camera device, a color on a captured image obtained by synthesis by the HDR function may be a color different from an actual color depending on an imaging environment. Therefore, for example, on a captured image captured when a subject to be monitored appears, it is not possible to accurately identify the color of a target portion (for example, clothes, hair, or a vehicle body) of the subject, and efficiency of a monitoring task may be reduced.

For example, when the imaging environment is in a backlight state, an original white portion of a subject may change to a gray color on the captured image obtained by the HDR function. This is because, since a bright subject portion of one captured image (corresponding to the second shutter release) obtained by capturing the dark subject is whitened, when one captured image (corresponding to the first shutter release) obtained by capturing the bright subject and one captured image (corresponding to the second shutter release) obtained by capturing the dark subject are synthesized, for example, brightness of a portion of white clothes worn by the dark subject is relatively lowered, and correction is performed so that gray clothes are worn.

The case where the color on the captured image changes depending on the imaging environment does not necessarily occur only between the white color and the gray color. For example, when the imaging environment is a low illuminance (for example, at night), the luminance of the captured image decreases as a whole, and thus the white portion may become gray, the gray portion may become black, or an orange portion may become brown. When the imaging environment is irradiated with red illumination such as halogen light, the captured image is entirely reddish, and thus the white portion may become orange or the orange portion may become red. Such a change in color is not limited to the above-described case, and is, for example, a phenomenon that may occur between adjacent colors in a hue saturation value (HSV) color space.

Therefore, in the following first embodiment, an example of a camera device and an image processing method will be described in which determination processing of a color of a subject on a captured image is adaptively adjusted in accordance with setting of an image quality parameter, and extraction accuracy of attribute information related to the color of the subject on the captured image is improved.

Hereinafter, embodiments specifically disclosing a camera device and an image processing method according to the present disclosure will be described in detail with reference to the drawings as appropriate. However, unnecessarily detailed descriptions may be omitted. For example, a detailed description of a well-known matter or a repeated description of substantially the same configuration may be omitted. This is to avoid unnecessary redundancy in the following description and to facilitate understanding for those skilled in the art. It should be noted that the accompanying drawings and the following description are provided to enable those skilled in the art to fully understand the present invention, and are not intended to limit the range of the claims.

First Embodiment

Figure 1:
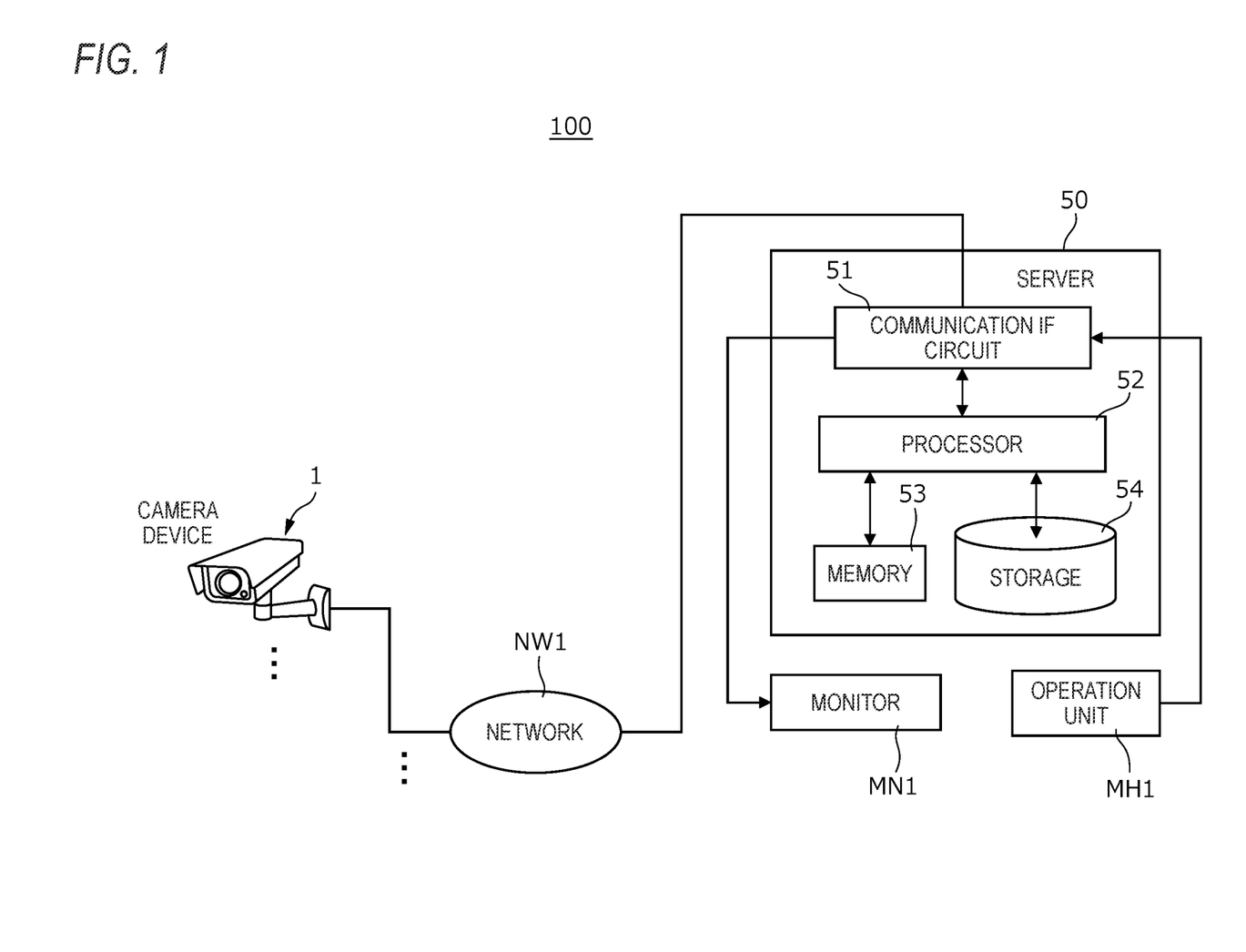
FIG. 1 is a diagram showing a system configuration example of a monitoring camera system according to a first embodiment.

FIG. 1 is a diagram showing a system configuration example of a monitoring camera system 100 according to a first embodiment. As shown in FIG. 1, the monitoring camera system 100 includes a camera device 1 and a server 50 to which each of a monitor MN1 and an operation unit MH1 is connected. The camera device 1 and the server 50 are connected to each other via a network NW1 so as to be able to transmit and receive data to and from each other.

The network NW1 is, for example, a wireless network conforming to any one of a wireless local area network (LAN) such as Wi-Fi (registered trademark), a cellular mobile communication scheme such as 4G or 5G, Bluetooth (registered trademark), and Wireless Gigabit (WiGig), but is not limited thereto. The network NW1 may be a wired network such as a universal serial bus (USB) cable or a wired LAN. In the following description, an image captured by the camera device 1 (hereinafter referred to as a "captured image") includes not only data of the captured image but also information on a camera identification (ID) and an imaging date and time of the camera device 1 that captures the captured image.

The camera device 1 is, for example, a monitoring camera installed in an imaging area AR1 in a town or the like, and identifies (determines) a color of a target portion (for example, clothes of an upper body of a person, clothes of a lower body of a person, a bag, a vehicle body of a vehicle) of a subject (for example, a person or a vehicle included in an angle of view from an installation position of the camera device 1). The imaging area AR1, which is the installation position of the camera device 1, is not limited to being in the town, and may be in a store, a building, or the like. The camera device 1 captures the captured image of the subject (see the above description) within the angle of view. The camera device 1 is mounted so as to be able to implement artificial intelligence (AI), and detects the subject (see the above description) from the captured image, or primarily determines the color of the target portion (see the above description) of the subject on a cut-out image (see FIG. 3) obtained by cutting out the subject for each detected subject, using the mounted artificial intelligence (see details described later).

The camera device 1 stores, in a trained model memory 152, a trained model obtained in advance by training processing in accordance with various kinds of processing by the AI described above (see FIG. 2). The camera device 1 performs the detection of the subject and the primary determination of the color of the target portion described above by using the trained model. The trained model is generated by, for example, training processing performed by another device (not shown) or the server 50, and is stored in the camera device 1.

When a determination result of the color of the target portion (see the above description) of the subject primarily determined by the AI is a predetermined color (for example, gray color) having a plurality of gradations (see FIG. 4), the camera device 1 adjusts the determination result of the color of the target portion (see the above description) of the subject primarily determined based on the image quality parameter (see FIG. 3) set in the camera device 1. Details of the adjustment processing will be described later with reference to FIGS. 3 and 4. The camera device 1 transmits, to the server 50, at least a primary determination result of the color of the target portion of the subject or an adjustment result thereof and information on the target portion (see the following description) in association with each other.

The server 50 as an example of an external device is, for example, an information processing device such as a personal computer, a smartphone, a tablet terminal, or a server computer machine having high performance specifications. The server 50 performs data communication with the camera device 1 via the network NW1.

The server 50 includes a communication interface circuit 51, a processor 52, a memory 53, and a storage 54. In the accompanying drawings, the interface is simply referred to as "IF" for convenience.

The communication interface circuit 51 performs the data communication with the camera device 1 via the network NW1 described above. The communication interface circuit 51 receives, for example, at least the primary determination result of the color of the target portion of the subject or the adjustment result thereof and information on the target portion (see the following description) transmitted from the camera device 1, and outputs a result to the processor 52. When data of a cut-out image CT1 (see FIG. 3) obtained by cutting out a portion of the subject is also transmitted from the camera device 1, the communication interface circuit 51 may receive the data of the cut-out image CT1 (see FIG. 3). Hereinafter, the primary determination result of the color of the target portion of the subject or the adjustment result thereof and the information on the target portion (see the following description), or the primary determination result of the color of the target portion of the subject or the adjustment result thereof, the information on the target portion (see the following description), and the data of the cut-out image CT1 (see FIG. 3) may be collectively referred to as reception data. The data of the cut-out image CT1 (see FIG. 3) may be image data of a thumbnail that is highly compressed to such an extent that a content of the cut-out subject can be substantially identified, or may be image data that is low-compressed (including uncompressed) to such an extent that the content of the subject can be clearly identified.

The processor 52 is implemented using, for example, a central processing unit (CPU), a digital signal processor (DSP), a graphical processing unit (GPU), or a field-programmable gate array (FPGA). The processor 52 functions as a controller that controls an overall operation of the server 50, and performs control processing for controlling an operation of each unit of the server 50, data input and output processing between the units of the server 50, data calculation processing, and data storage processing. The processor 52 operates in accordance with the program and the data stored in the memory 53. The processor 52 uses the memory 53 during the operation, and temporarily stores data or information generated or acquired by the processor 52 in the memory 53.

When the processor 52 receives the reception data (see the above description) received by the communication interface circuit 51, the processor 52 extracts the primary determination result of the color of the target portion of the subject or the adjustment result thereof and information on the target portion (see the following description) from the reception data, and accumulates and stores the results in the storage 54. When the processor 52 further extracts the data of the cut-out image CT1 (see FIG. 3) from the reception data, the processor 52 stores the primary determination result or the adjustment result of the color of the target portion of the subject, the information on the target portion (see the following description), and the data of the cut-out image CT1 (see FIG. 3) in the storage 54 in association with each other.

The processor 52 can execute, in cooperation with the memory 53, an application for searching for and extracting data of the cut-out image (for example, image data of a thumbnail satisfying a search condition) satisfying a search condition input by an operation of a user (for example, an administrator of the monitoring camera system 100) using the operation unit MH1. The processor 52 searches the storage 54 for data of the cut-out image (for example, image data of the thumbnail satisfying the search condition) satisfying the search condition (for example, a person whose color of the target portion such as clothes is white) input by the operation of the user (for example, the administrator of the monitoring camera system 100) using the operation unit MH1, and displays a search result on the monitor MN1.

The memory 53 is implemented using, for example, a random access memory (RAM) and a read only memory (ROM), and temporarily holds a program necessary for executing the operation of the server 50, and data or information generated during an operation. The RAM is, for example, a work memory used when the server 50 operates. The ROM stores and holds, for example, a program for controlling the server 50 in advance.

The storage 54 is implemented using, for example, a flash memory, a hard disk drive (HDD), or a solid state drive (SSD). The storage 54 accumulates and stores, for example, the reception data (see the above description) transmitted from the camera device 1.

The monitor MN1 is a display device implemented using, for example, a liquid crystal display (LCD) or organic electroluminescence (EL). The monitor MN1 displays, for example, a result of search processing executed by the server 50. The monitor MN1 may be included in the server 50.

The operation unit MH1 is an input device that receives an input operation of the user (for example, the administrator of the monitoring camera system 100) such as a mouse, a keyboard, a touch pad, or a touch panel. The operation unit MH1 transmits a signal corresponding to the input operation of the user (for example, the administrator of the monitoring camera system 100) to the server 50. The operation unit MH1 may be included in the server 50.

Figure 2:
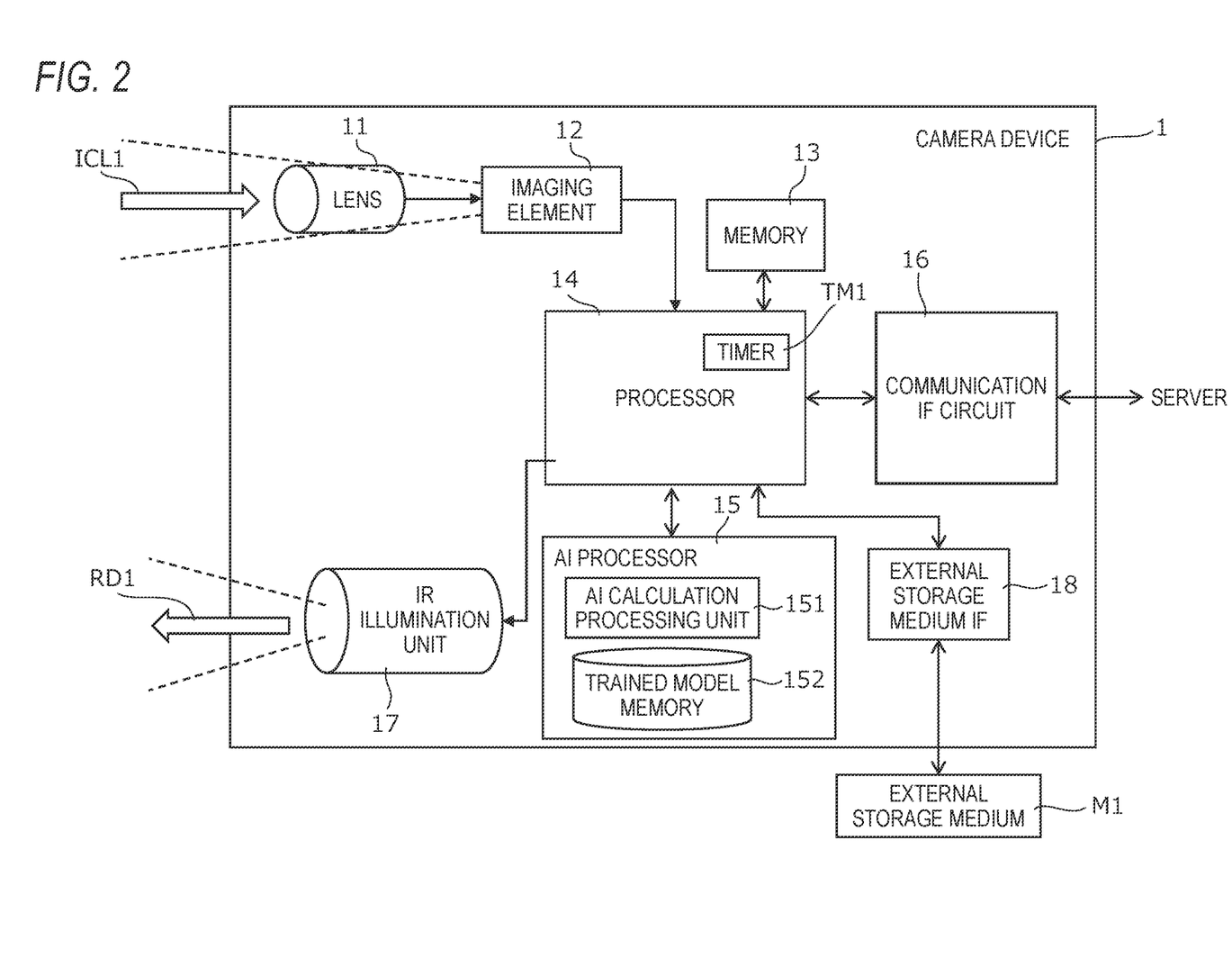
FIG. 2 is a block diagram showing a hardware configuration example of a camera device according to the first embodiment.

FIG. 2 is a block diagram showing a hardware configuration example of the camera device 1 according to the first embodiment. FIG. 2 shows an external storage medium M1 inserted into and removed from the camera device 1 in addition to the camera device 1. The external storage medium M1 is, for example, a storage medium such as an SD card.

As shown in FIG. 2, the camera device 1 includes a lens 11, an imaging element 12, a memory 13, a processor 14, an AI processor 15, a communication interface circuit 16, an IR illumination unit 17, and an external storage medium interface 18.

The lens 11 as an example of an imaging unit includes, for example, a focus lens and a zoom lens, and forms an optical image of the subject on a light receiving surface (imaging surface) of the imaging element 12 by receiving incident light ICL1 which is light reflected by the subject. The incident light ICL1 includes, for example, not only light reflected by the subject included in an angle of view in a daytime or at night in the imaging area AR1 such as the town in which the camera device 1 is installed, but also daytime sunlight. As the lens 11, lenses having various focal lengths or imaging ranges can be used depending on an installation location, an imaging use, or the like of the camera device 1.

The imaging element 12 as an example of an imaging unit is an image sensor such as, for example, a charge coupled device (CCD), a complementary metal oxide semiconductor (CMOS). The imaging element 12 performs photoelectric conversion for converting light received by the light receiving surface (imaging surface) into an electric signal. Accordingly, the imaging element 12 can acquire red green blue (RGB) signals corresponding to light from the subject for each pixel of a predetermined size constituting the light receiving surface (imaging surface). The imaging element 12 outputs the electric signal (analog signal) corresponding to the light received by the light receiving surface to the processor 14. The analog signal is converted into data of the captured image in a digital format by the processor 14 as an example of the imaging unit. Accordingly, the data of the captured image is generated by the processor 14.

The memory 13 is implemented by using, for example, a RAM and a ROM, and temporarily holds a program necessary for executing the operation of the camera device 1, and further, data or information generated during the operation. The RAM is, for example, a work memory used during the operation of the camera device 1. The ROM stores and holds, for example, a program for controlling the camera device 1 in advance. In other words, the processor 14 can execute various kinds of processing that define the image processing method according to the present disclosure in the camera device 1, which is a computer, by executing the program stored in the ROM.

The memory 13 stores camera parameters (for example, the image quality parameters) related to imaging of the imaging unit (for example, the imaging element 12). Here, the image quality parameter is, for example, a parameter indicating whether the HDR function is on or off and an exposure ratio (that is, when the HDR function is on, a ratio between an exposure time in accordance with imaging of the bright subject at the first shutter speed and an exposure time in accordance with imaging of the dark subject at the second shutter speed).

The processor 14 is implemented using, for example, a CPU, a DSP, a GPU, or an FPGA. The processor 14 functions as a controller that governs the overall operation of the camera device 1, and performs control processing for governing the operation of each unit of the camera device 1, data input and output processing with respect to each unit of the camera device 1, data calculation processing, and data storage processing. The processor 14 operates in accordance with programs and data stored in the memory 13. The processor 14 uses the memory 13 at the time of operation, and temporarily stores data or information generated or acquired by the processor 14 in the memory 13.

The processor 14 as an example of the imaging unit may generate the data of the captured image in the digital format by performing predetermined signal processing on the electric signal output from the imaging element 12. The processor 14 transmits the generated data of the captured image to the AI processor 15.

The processor 14 includes a timer TM1, can grasp a current time based on the output of the timer TM1, and outputs a control signal instructing irradiation of IR light to the IR illumination unit 17 at night (in other words, near sunset to near dawn). The timer TM1 includes a circuit that measures an elapsed time (that is, a current time) from a predetermined reference time, and transmits a measurement output (count value) to the processor 14. Accordingly, the processor 14 can specify the current time.

When the color of the target portion (see the above description) of the subject by a color determination AI model (see FIG. 3) described later is a predetermined color having a plurality of gradations (for example, gray color having six gradations), the processor 14 as an example of a second determination unit adjusts a determination result (that is, score) of the gray color of the target portion based on the image quality parameter stored in the memory 13. Details of the adjustment processing will be described later with reference to FIGS. 3 and 4.

The AI processor 15 includes an AI calculation processing unit 151 and a trained model memory 152. That is, the AI processor 15 selects and uses a trained model stored in the trained model memory 152, and causes the AI calculation processing unit 151 to execute specific processing corresponding to the trained model.

The AI calculation processing unit 151 is implemented by using, for example, a CPU, a DSP, a GPU, or an FPGA, selects and uses any one of trained models stored in the trained model memory 152, and executes specific processing corresponding to the trained model.

For example, the AI calculation processing unit 151 as an example of a detection unit reads and executes an AI trained model for detecting the subject such as the person or the vehicle (that is, an object detection AI model shown in FIG. 3) from the trained model memory 152, and detects and extracts a subject to be monitored from data of the captured image captured by the imaging element 12.

For example, the AI calculation processing unit 151 as an example of a first determination unit reads the AI trained model (that is, the color determination AI model shown in FIG. 3) for primarily determining the color of the target portion (for example, clothes, hair, or the vehicle body) of the subject such as the person or the vehicle from the trained model memory 152 and executes the trained model, and primarily determines the color of the target portion (for example, clothes, hair, or the vehicle body) of the subject detected from the data of the cut-out image resized (see FIG. 3) by the AI calculation processing unit 151. Each time the subject is detected from the data of the captured image captured by the imaging element 12, the AI calculation processing unit 151 primarily determines the color of the target portion (for example, clothes, hair, or the vehicle body) of the subject. Details of the primary determination processing will be described later with reference to FIG. 3.

The trained model memory 152 is implemented with, for example, a memory such as a RAM, a ROM, or a flash memory. The trained model memory 152 stores the trained model (for example, the object detection AI model and the color determination AI model described above) created in advance by the training processing.

The communication interface circuit 16 as an example of a communication unit performs data communication (transmission and reception) with the server 50 connected via the network NW1. The communication interface circuit 16 transmits, to the server 50, for example, reception data generated by the processor 14 (that is, data of the primary determination result of the color of the target portion of the subject or the adjustment result thereof and information on the target portion (see the following description), or the primary determination result of the color of the target portion of the subject or the adjustment result thereof, information on the target portion (see the following description), and the cut-out image CT1 (see FIG. 3)). When the communication interface circuit 16 receives the camera parameter (for example, the parameter indicating on or off of the HDR function described above, and the exposure ratio) from the server 50, the communication interface circuit 16 stores the camera parameter in the memory 13.

The IR illumination unit 17 starts irradiation of IR light RD1 having a near-infrared wavelength band toward the imaging area based on a control signal (for example, an instruction to start irradiation of IR light) from the processor 14. The IR illumination unit 17 ends the irradiation of the imaging area with the JR light RD1 based on a control signal (for example, an instruction to end the irradiation of the IR light RD1) from the processor 14. The IR illumination unit 17 irradiates the IR light RD1 while increasing or decreasing an intensity of the IR light RD1 that is currently irradiated, based on a control signal (for example, an instruction to adjust the intensity of the IR light RD1) from the processor 14.

An external storage medium M1 such as an SD card is inserted into and removed from the external storage medium interface 18.

Figure 3:
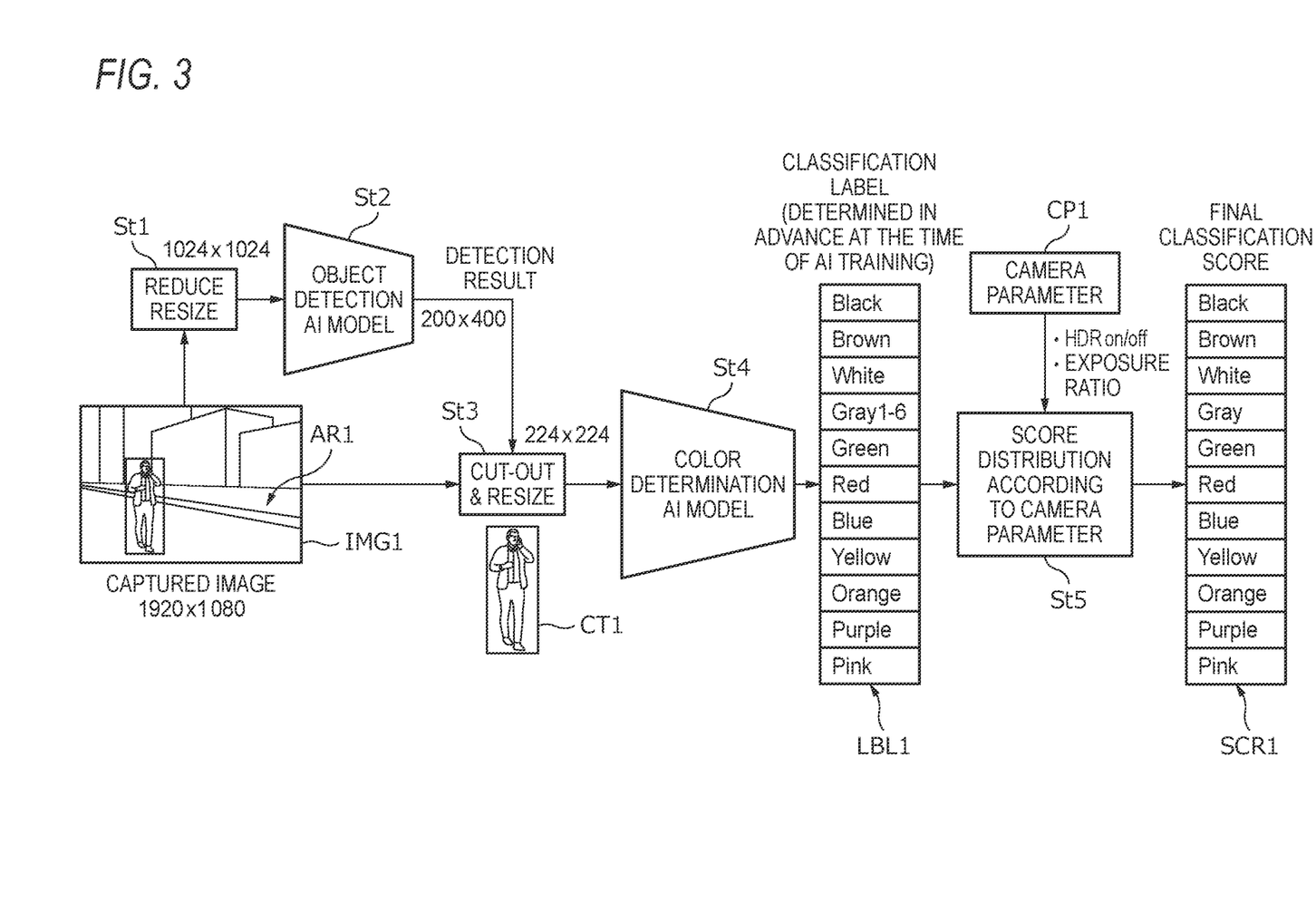
FIG. 3 is a diagram showing an operation outline example of a processor and an AI processor of the camera device according to the first embodiment.
Figure 4:
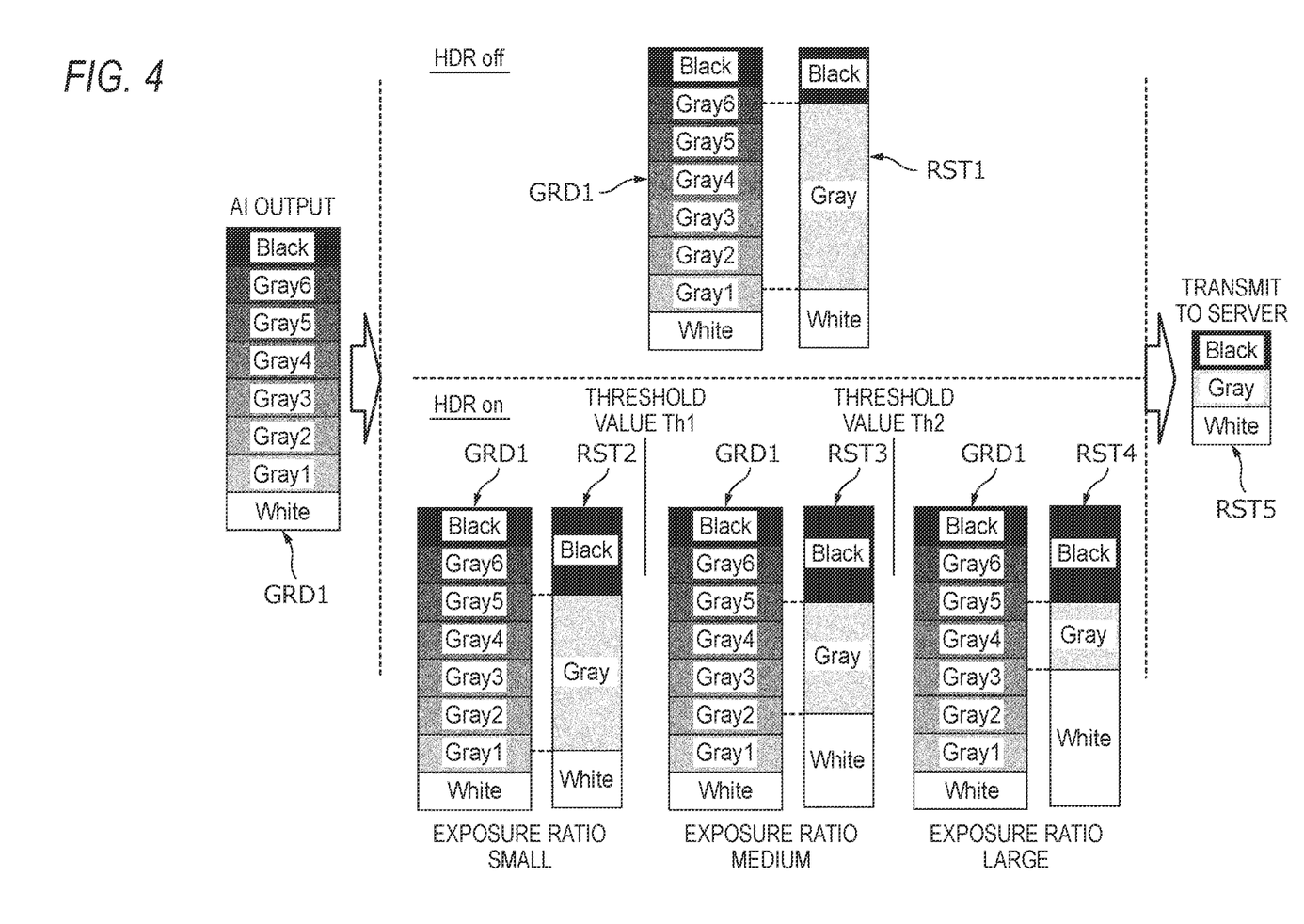
FIG. 4 is a diagram showing an outline example of white, gray, and black identification processing according to on/off of an HDR function and an exposure ratio.

Next, an operation outline example of the processor 14 and the AI processor 15 of the camera device 1 according to the first embodiment will be described with reference to FIGS. 3 and 4. FIG. 3 is a diagram showing the operation outline example of the processor 14 and the AI processor 15 of the camera device 1 according to the first embodiment. FIG. 4 is a diagram showing an outline example of white, gray, and black identification processing of according to on/off of the HDR and the exposure ratio.

In FIG. 3, the processor 14 generates a captured image IMG1 of the imaging area AR1 captured by the imaging element 12. Here, the size of the captured image IMG1 is, for example, 1920 [dpi]×1080 [dpi], whereas the size of the captured image IMG1 is not limited to the size. The processor 14 reduces (resizes) the size of the captured image IMG1 so that the captured image IMG1 can be input to the object detection AI model executed by the AI processor 15 to be described later, and transmits the captured image IMG1 to the AI processor 15 (St1). For example, the processor 14 resizes the captured image IMG1 so as to reduce the size of the captured image IMG1 to 1024 [dpi]×1024 [dpi].

The AI processor 15 reads and executes the object detection AI model from, for example, the trained model memory 152, detects the subject (for example, the person) from the captured image resized in step St1, and transmits information on the subject (for example, a position, sex, age, and the like of the subject) to the processor 14 (St2). For example, the size of the subject detected by the object detection AI model is 200 [dpi]×400 [dpi].

The processor 14 as an example of a cut-out processing unit generates the cut-out image CT1 obtained by cutting out an outer shape portion including a contour of the subject from the captured image IMG1 before the resize processing in step St1 using the captured image IMG1 before the resize processing in step St1 and the information (see the above description) on the subject from the AI processor 15 in step St2 (St3). Further, the processor 14 resizes the size of the cut-out image CT1 and transmits the resized cut-out image CT1 to the AI processor 15 so that the cut-out image CT1 can be input to the color determination AI model executed by the AI processor 15 to be described later (St3). For example, the processor 14 resizes the size of the cut-out image CT1 to 224 [dpi]×224 [dpi].

The AI processor 15 reads the color determination AI model from, for example, the trained model memory 152 and executes the color determination AI model, determines the color of the target portion (for example, clothes of the upper body and clothes of the lower body) of the subject from the cut-out image of the subject resized in step St3, and transmits the determination result to the processor 14 (St4). For example, as an output of step St4, the AI processor 15 calculates, for each color of a classification label LBL1, a probability indicating which of the colors constituting the classification label LBL1 the color of the target portion (see the above description) of the subject is closest to, using the classification label LBL1 including a plurality of predetermined color items. The classification label LBL1 is determined in advance at the time of the training processing of the color determination AI model. The classification label LBL1 is formed of, for example, black, brown, white, and gray, green, red, blue, yellow, orange, purple, and pink colors having six gradations.

When the color of the target portion (see the above description) of the subject by the color determination AI model is the predetermined color having a plurality of gradations (for example, gray color having six gradations) in step St4, the processor 14 adjusts the determination result (that is, score) of the gray color of the target portion (for example, score distribution according to the camera parameter) based on a camera parameter CP1 (for example, the above described image quality parameter) stored in the memory 13 (St5). That is, as described above, in the backlight state, in the captured image captured when the HDR function is on, an original white portion of the subject (for example, white clothes worn by the person) may change to the gray color. Therefore, in order to reduce a difference between a classification result of an actual color and a classification result of the color due to the change in color on the captured image, the score corresponding to the portion determined to be the gray color by the color determination AI model is adjusted according to the camera parameter CP1. The processor 14 organizes and integrates adjustment results of the scores performed in step St5 as a final classification score SCR1.

Figure 5A:
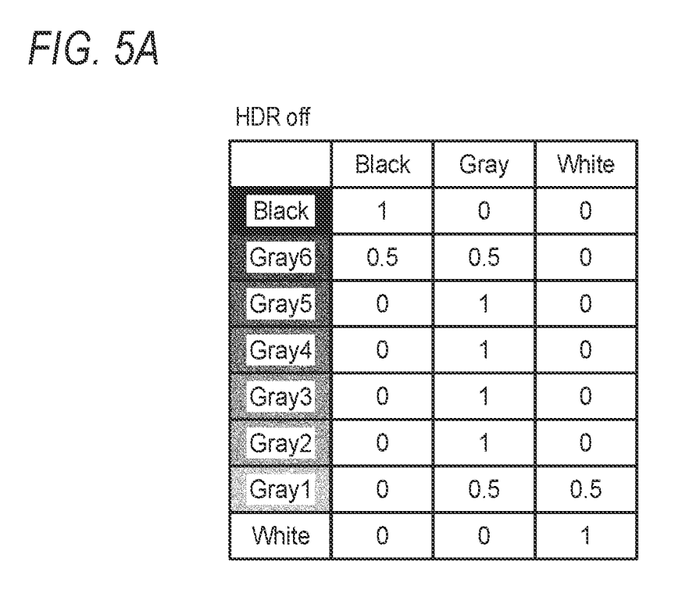
FIG. 5A is a diagram showing an example of a color determination table when the HDR function is off.
Figure 5B:
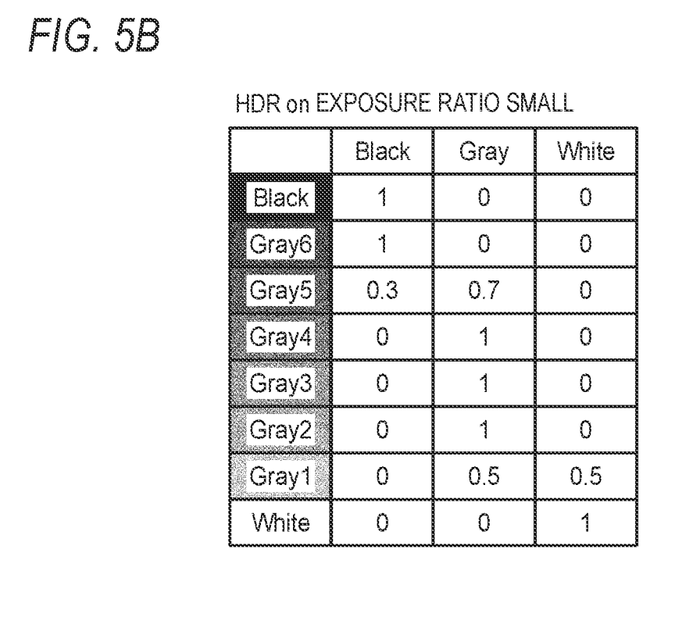
FIG. 5B is a diagram showing an example of the color determination table when the HDR function is on and the exposure ratio is small.
Figure 5C:
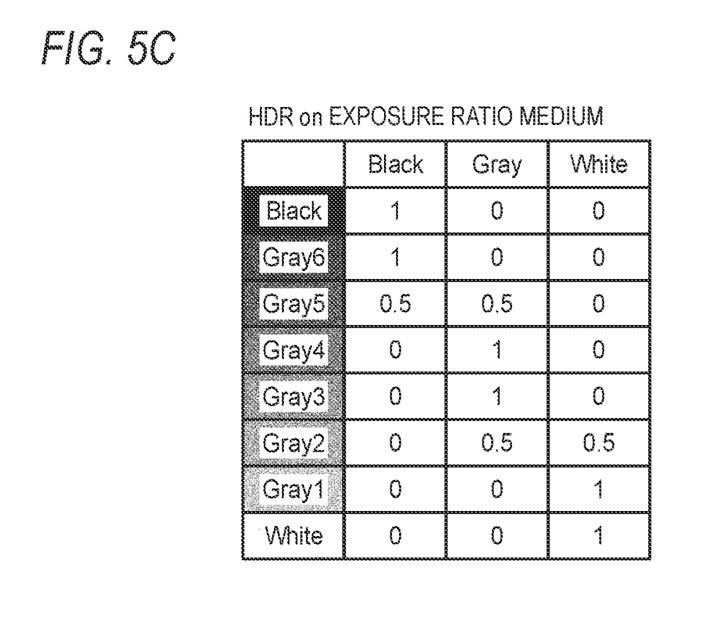
FIG. 5C is a diagram showing an example of the color determination table when the HDR function is on and the exposure ratio is medium.
Figure 5D:
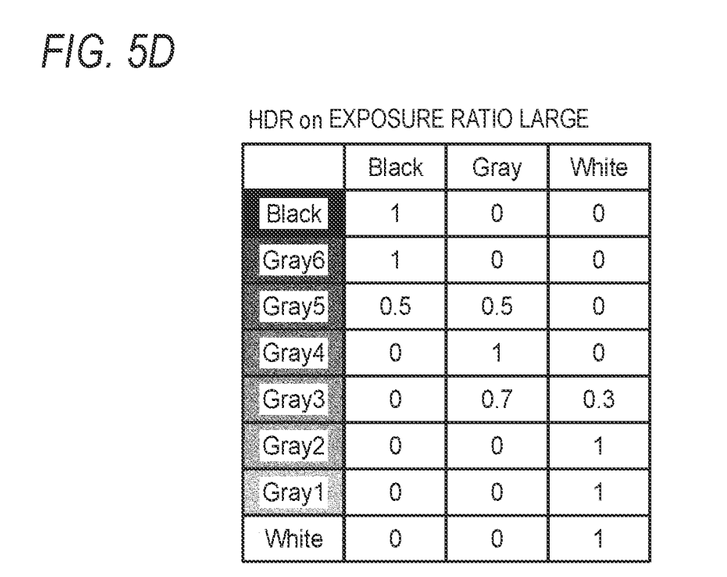
FIG. 5D is a diagram showing an example of the color determination table when the HDR function is on and the exposure ratio is large.

Next, an example of a processing outline of the processor 14 in step St5 described above will be described with reference to FIGS. 4, 5A, 5B, 5C, and 5D. FIG. 5A is a diagram showing an example of a color determination table TBL1 when the HDR function is off. FIG. 5B is a diagram showing an example of a color determination table TBL2 when the HDR function is on and the exposure ratio is small. FIG. 5C is a diagram showing an example of a color determination table TBL3 when the HDR function is on and the exposure ratio is medium. FIG. 5D is a diagram showing an example of a color determination table TBL4 when the HDR function is on and the exposure ratio is large.

In the example of FIG. 4, a case in which the color of the target portion (for example, clothes of the upper body) of the subject (for example, a male person) is determined to be a gray color having six gradations by the color determination AI model is shown. For example, the six gradations are Gray 1, Gray 2, Gray 3, Gray 4, Gray 5, and Gray 6, and Gray 1 is closest to white and Gray 6 is closest to black.

In FIG. 4, it is assumed that a score GRD1 of a color item including white, Gray 1, Gray 2, Gray 3, Gray 4, Gray 5, Gray 6, and black is obtained by the color determination AI model.

When the camera parameter CP1 stored in the memory 13 is the HDR function off, the processor 14 reads the color determination table TBL1 corresponding to the HDR function off from the memory 13. The color determination table TBL1 is used when the HDR function of the camera device 1 is off, and is a table that defines a weight coefficient (specific gravity) for assigning any color among black, gray, and white for each color item (that is, classification label) calculated by the color determination AI model. The processor 14 calculates a multiplication result of the weight coefficient (specific gravity) for each classification label defined in the color determination table TBL1 and the score of each classification label for each of black, gray, and white, derives a score RST1 of a calculation result as an adjustment result RST5 of a final classification score SCR1, and transmits the adjustment result RST5 to the server 50 as the determination result of the color of the target portion.

For example, for black, the processor 14 calculates (the score of the classification label "Black"×the weight coefficient "1.0")+(the score of the classification label "Gray 6"×the weight coefficient "0.5"). Similarly, for the gray color, the processor 14 calculates (the score of the classification label "Gray 6"×the weight coefficient "0.5")+(the score of the classification label "Gray 5"×the weight coefficient "1.0")+(the score of the classification label "Gray 4"×the weight coefficient "1.0")+(the score of the classification label "Gray 3"×the weight coefficient "1.0")+(the score of the classification label "Gray 2"×the weight coefficient "1.0")+(the score of the classification label "Gray 1"×the weight coefficient "0.5"). Similarly, for white, the processor 14 calculates (the score of the classification label "Gray 1"×the weight coefficient "0.5")+(the score of the classification label "White"×the weight coefficient "1.0"). The calculation results of the three colors of black, gray, and white are derived by the processor 14 as the adjustment result RST5 of the final classification score SCR1.

When the camera parameter CP1 stored in the memory 13 is the HDR function on and the exposure ratio (see the above description) is less than a threshold value Th1, the processor 14 reads the color determination table TBL2 corresponding to the HDR function on and the small exposure ratio from the memory 13. The color determination table TBL2 is a table that is used when the HDR function of the camera device 1 is on and the exposure ratio is less than the threshold value Th1, and defines the weight coefficient (specific gravity) for assigning any color among black, gray, and white for each color item (that is, classification label) calculated by the color determination AI model. The processor 14 calculates a multiplication result of the weight coefficient (specific gravity) for each classification label defined in the color determination table TBL2 and the score of each classification label for each of black, gray, and white, derives a score RST2 of a calculation result as the adjustment result RST5 of the final classification score SCR1, and transmits the adjustment result RST5 to the server 50 as the determination result of the color of the target portion.

For example, for black, the processor 14 calculates (the score of the classification label "Black"×the weight coefficient "1.0")+(the score of the classification label "Gray 6"×the weight coefficient "0.7")+(the score of the classification label "Gray 5"×the weight coefficient "0.3"). Similarly, for the gray color, the processor 14 calculates (the score of the classification label "Gray 5"×the weight coefficient "0.7")+(the score of the classification label "Gray 4"×the weight coefficient "1.0")+(the score of the classification label "Gray 3"×the weight coefficient "1.0")+(the score of the classification label "Gray 2"×the weight coefficient "1.0")+(the score of the classification label "Gray 1"×the weight coefficient "0.5"). Similarly, for white, the processor 14 calculates (the score of the classification label "Gray 1"×the weight coefficient "0.5")+(the score of the classification label "White"×the weight coefficient "1.0"). The calculation results of the three colors of black, gray, and white are derived by the processor 14 as the adjustment result RST5 of the final classification score SCR1.

When the camera parameter CP1 stored in the memory 13 is the HDR function on and the exposure ratio (see the above description) is equal to or greater than the threshold value Th1 and less than a threshold value Th2, the processor 14 reads the color determination table TBL3 corresponding to the HDR function on and the exposure ratio medium from the memory 13. The color determination table TBL3 is a table that is used when the HDR function of the camera device 1 is on and the exposure ratio is equal to or greater than the threshold value Th1 and less than the threshold value Th2, and defines the weight coefficient (specific gravity) for assigning any color among black, gray, and white for each color item (that is, classification label) calculated by the color determination AI model. The processor 14 calculates a multiplication result of the weight coefficient (specific gravity) for each classification label defined in the color determination table TBL3 and the score of each classification label for each of black, gray, and white, derives a score RST3 of a calculation result as the adjustment result RST5 of the final classification score SCR1, and transmits the adjustment result RST5 to the server 50 as the determination result of the color of the target portion.

For example, for black, the processor 14 calculates (the score of the classification label "Black"×the weight coefficient "1.0")+(the score of the classification label "Gray 6"×the weight coefficient "1.0")+(the score of the classification label "Gray 5"×the weight coefficient "0.5"). Similarly, for the gray color, the processor 14 calculates (the score of the classification label "Gray 5"×the weight coefficient "0.5")+(the score of the classification label "Gray 4"×the weight coefficient "1.0")+(the score of the classification label "Gray 3"×the weight coefficient "1.0")+(the score of the classification label "Gray 2"×the weight coefficient "0.5"). Similarly, for white, the processor 14 calculates (the score of the classification label "Gray 2"×the weight coefficient "0.5")+(the score of the classification label "Gray 1"×the weight coefficient "1.0")+(the score of the classification label "White"×the weight coefficient "1.0"). The calculation results of the three colors of black, gray, and white are derived by the processor 14 as the adjustment result RST5 of the final classification score SCR1.

When the camera parameter CP1 stored in the memory 13 is the HDR function on and the exposure ratio (see the above description) is equal to or greater than the threshold value Th2, the processor 14 reads the color determination table TBL4 corresponding to the HDR function on and the large exposure ratio from the memory 13. The color determination table TBL4 is a table that is used when the HDR function of the camera device 1 is on and the exposure ratio is equal to or greater than the threshold value Th2, and defines a weight coefficient (specific gravity) for assigning any color among black, gray, and w % bite for each color item (that is, classification label) calculated by the color determination AI model. The processor 14 calculates a multiplication result of the weight coefficient (specific gravity) for each classification label defined in the color determination table TBL4 and the score of each classification label for each of black, gray, and white, derives a score RST4 of a calculation result as the adjustment result RST5 of the final classification score SCR1, and transmits the adjustment result RST5 to the server 50 as the determination result of the color of the target portion.

For example, for black, the processor 14 calculates (the score of the classification label "Black"×the weight coefficient "1.0")+(the score of the classification label "Gray 6"×the weight coefficient "1.0")+(the score of the classification label "Gray 5"×the weight coefficient "0.5"). Similarly, for the gray color, the processor 14 calculates (the score of the classification label "Gray 5"×the weight coefficient "0.5")+(the score of the classification label "Gray 4"×the weight coefficient "1.0")+(the score of the classification label "Gray 3"×the weight coefficient "0.7"). Similarly, for white, the processor 14 calculates (the score of the classification label "Gray 3"×the weight coefficient "0.3")+(the score of the classification label "Gray 2"×the weight coefficient "1.0")+(the score of the classification label "Gray 1"×the weight coefficient "1.0")+(the score of the classification label "White"×the weight coefficient "1.0"). The calculation results of the three colors of black, gray, and white are derived by the processor 14 as the adjustment result RST5 of the final classification score SCR1.

Figure 6:
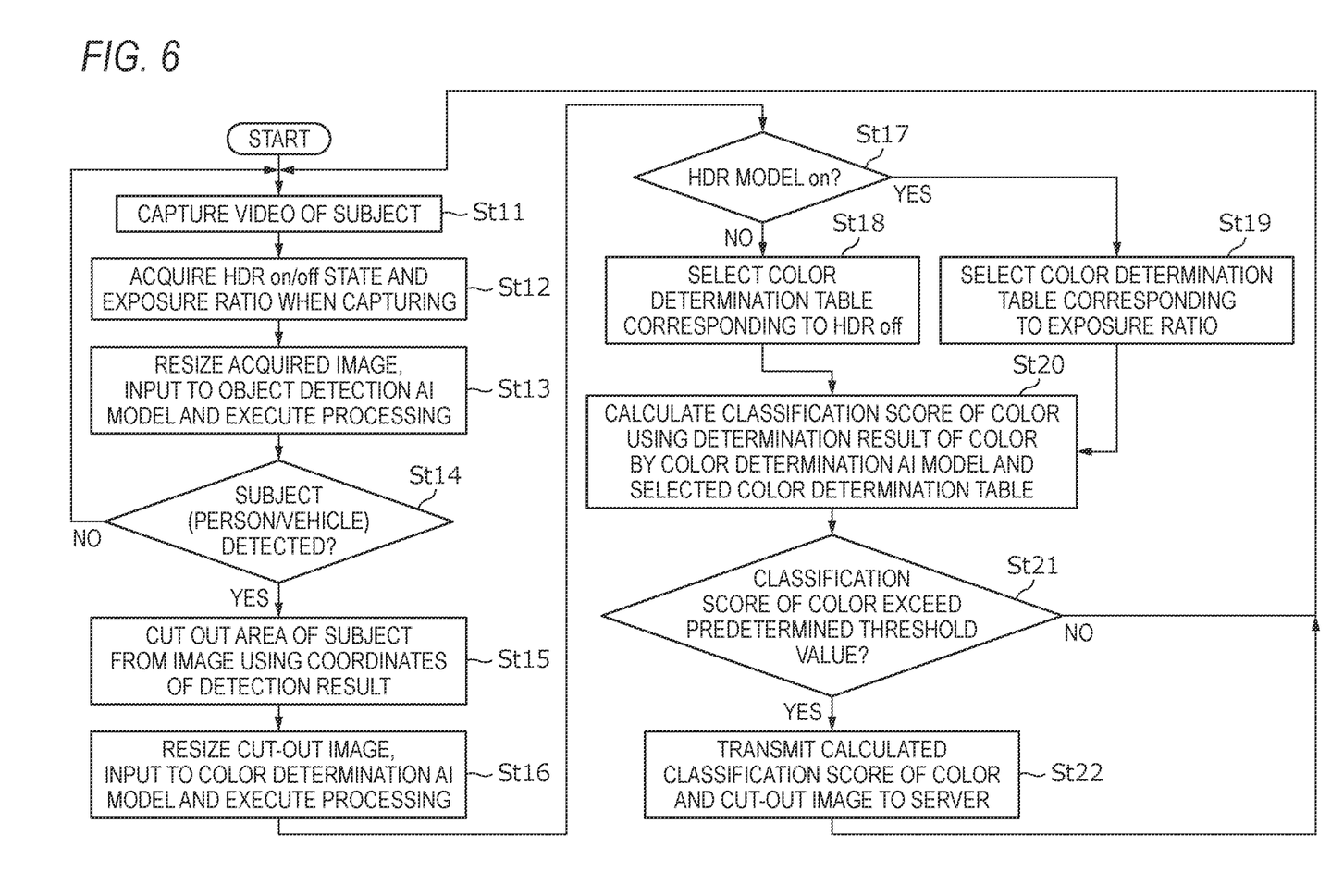
FIG. 6 is a flowchart showing an example of an operation procedure of the camera device according to the first embodiment.

Next, an example of an operation procedure of the camera device 1 according to the first embodiment will be described with reference to FIG. 6. FIG. 6 is a flowchart showing an example of the operation procedure of the camera device 1 according to the first embodiment. Each processing shown in FIG. 6 is executed by the processor 14 or the AI processor 15 of the camera device 1.

In FIG. 6, a video of the subject in the imaging area AR1 in which the camera device 1 is installed is captured by the imaging element 12 (St11). The processor 14 performs predetermined signal processing on the electric signal output from the imaging element 12 to generate data of the captured image in the digital format, and transmits the data to the AI processor 15. At this time, the processor 14 reads and acquires the on or off state of the HDR function as an example of the camera parameter CP1 related to imaging and the exposure ratio from the memory 13 (St12). The camera parameter CP1 may be set and stored in the memory 13, for example, when the camera device 1 is initially installed in the imaging area AR1, or may be stored in the memory 13 in accordance with an instruction from the server 50.

The AI processor 15 resizes the data of the captured image generated in step St1 so as to match the input of the object detection AI model (an example of the trained model) for detecting the subject such as the person or the vehicle (see FIG. 3) (St13). Further, the AI processor 15 reads the object detection AI model from the trained model memory 152 and executes the object detection AI model, and detects and extracts the subject (for example, the person or the vehicle) to be monitored from the data of the captured image after the resizing in step St13 (St14). When the subject (for example, the person or the vehicle) is not detected (St14, NO), the processing of the camera device 1 returns to step St11.

On the other hand, when the subject (for example, the person or the vehicle) is detected by the AI processor 15 (St14, YES), the processor 14 cuts out an area of the subject (for example, the person or the vehicle) from the resized captured image using a position (for example, coordinates) of the subject (for example, the person or the vehicle) on the resized captured image input to the object detection AI model, generates a cut-out image (for example, the cut-out image CT1 of FIG. 3), and transmits the cut-out image to the AI processor 15 (St15).

The AI processor 15 resizes the data of the cut-out image generated in step St15 so as to match the input of the color determination AI model (an example of the trained model) for primarily determining the color of the target portion (for example, clothes, hair, or the vehicle body) of the subject such as the person or the vehicle (see FIG. 3) (St16). Further, the AI processor 15 reads out the color determination AI model from the trained model memory 152 and executes the color determination AI model, primarily determines the color of the target portion (for example, clothes, hair, or the vehicle body) of the subject from the data of the cut-out image after the resizing in step St16, and transmits the determination result to the processor 14 (St16).

The processor 14 refers to the memory 13 and determines whether the HDR function as an example of the camera parameter CP1 of the camera device 1 is on (St17). When the processor 14 determines that the HDR function is not on (that is, off) (St17, NO), the processor 14 selects the color determination table TBL1 corresponding to the HDR function off and reads the color determination table TBL1 from the memory 13 (St18).

On the other hand, when it is determined that the HDR function is on (St17, YES), the processor 14 selects one of the color determination tables (specifically, one of the color determination tables TBL1, TBL2, and TBL3) corresponding to the HDR function on and reads the selected color determination table from the memory 13 (St19).

The processor 14 calculates and adjusts the classification score of the color of the target portion of the subject in the cut-out image after resizing in step St16 by using the determination result of the primary color by the color determination AI model in step St16 and the color determination table selected in step St18 or St19 (St20). An example of the adjustment (calculation) in step St20 is described with reference to FIGS. 5A to 5D, and thus the description thereof is omitted here.

The processor 14 determines whether the classification score SCR1 (in other words, the determination result of the final color) of the color as the adjustment result in step St20 exceeds a predetermined threshold value (stored in the memory 13) prepared for each color item (St21). When it is determined that the classification score SCR1 of the color is less than the predetermined threshold value (for example, 0.3) prepared for each color item (St21, NO), the processing of the camera device 1 returns to step St11.

On the other hand, when it is determined that the classification score SCR1 of the color is equal to or greater than the predetermined threshold value (for example, 0.3) prepared for each color item (St21, YES), the processor 14 transmits the classification score SCR1 of the color calculated in step St20, information (for example, clothes, hair, and the vehicle body) on the target portion of the subject (for example, the person or the vehicle), and the cut-out image generated in step St16 to the server 50 (St22).

As described above, in the monitoring camera system 100 according to the first embodiment, the camera device 1 includes: an imaging unit that captures an image of an imaging area AR1 in which a subject (for example, a person or a vehicle) is present; the memory 13 that stores the camera parameter CP1 related to imaging; a detection unit (for example, the AI processor 15) that detects the subject from the captured image captured by the imaging unit; a first determination unit (for example, the AI processor 15) that primarily determines a color of a target portion (for example, clothes, hair, or a vehicle body) of the subject detected by the detection unit; a second determination unit (for example, the processor 14) that adjusts a determination result of a predetermined color corresponding to the target portion determined by the first determination unit based on the parameter related to imaging when the color of the target portion determined by the first determination unit is the predetermined color having a plurality of gradations (for example, a gray color having six gradations); and a communication unit (for example, the communication interface circuit 16) that transmits an adjustment result of the predetermined color corresponding to the target portion determined by the second determination unit and information on the target portion in association with each other to an external device (for example, the server 50).

Accordingly, the camera device 1 can adaptively adjust the determination processing of the color of the subject in the captured image, for example, even in the backlight state, according to the content of the setting of the image quality parameter (that is, the camera parameter CP1) set in the camera device 1. Therefore, the camera device 1 can improve the extraction accuracy of the attribute information (in other words, the color of the part to be targeted in the subject) related to the color of the subject on the captured image. Since it is not possible in the related art to cope with a change in color on the captured image when an environmental change occurs (for example, the backlight state occurs) at the time of imaging, determination accuracy of the color of the target portion of the subject is deteriorated, or it is necessary to construct a dedicated color determination AI model for each scene in which the change in color occurs, and thus development man-hours are increased. However, according to camera device 1 according to the first embodiment, since the score can be corrected by the color determination AI model according to camera parameter CP1, it is possible to perform the color determination capable of following the environmental change at the time of imaging without constructing a plurality of color determination AI models according to the type of the environment at the time of imaging, and it is possible to prevent the accuracy deterioration of the color determination due to the environmental change at the time of imaging.

The first determination unit primarily determines the color of the target portion of the subject every time the subject is detected by the detection unit. Accordingly, every time the subject (for example, the person or the vehicle) is detected in the imaging area AR1, the camera device 1 can continuously determine the color of the target portion of the detected subject.

The camera device 1 further includes a cut-out processing unit (for example, the processor 14) that generates a cut-out image (for example, the cut-out image CT1) obtained by cutting out the subject detected by the detection unit from the captured image. The communication unit transmits the adjustment result of the predetermined color corresponding to the target portion determined by the second determination unit, the information on the target portion, and the cut-out image to the external device in association with each other. Accordingly, the external device (for example, the server 50) can collectively receive and accumulate the reception data (that is, the primary determination result of the color of the target portion of the subject or the adjustment result thereof, the information on the target portion, and the data of the cut-out image) transmitted from the camera device 1.

The memory 13 stores the color determination tables TBL1 to TBL4 that define classification ratios to classification colors (for example, gray color or white color) corresponding to a plurality of gradations of a predetermined color that is primarily determined by the first determination unit according to the camera parameter CP1 related to imaging. The second determination unit selects the color determination table corresponding to the camera parameter CP1 related to imaging, and adjusts the determination result of the predetermined color corresponding to the target portion determined by the first determination unit based on any one of the selected color determination tables. Accordingly, the camera device 1 can correct the original color of the target portion of the subject even if there occurs a change (for example, a change from white to gray) when two captured images are synthesized by the HDR function in order to capture each of the bright subject and the dark subject in the backlight state, for example, and thus can accurately determine the color of the target portion of the subject.

The camera parameter CP1 related to imaging includes on or off of the high dynamic range (HDR) function and an exposure ratio of imaging. Accordingly, the camera device 1 can adaptively select the color determination table according to the on or off of the HDR function and the exposure ratio of imaging.

The first determination unit outputs a score indicating the certainty for each classification label of the color of the target portion as a primary determination result of the color of the target portion by AI processing using a trained model for primarily determining the color of the target portion. Accordingly, the camera device 1 can determine the color of the target portion of the subject with high accuracy.

The target portion is clothes or hair of a person present in the imaging area AR1, or a vehicle body of a vehicle present in the imaging area AR1. Accordingly, the camera device 1 can determine the color of the target portion such as the clothes and hair of the person present in the imaging area AR1 or the vehicle body of the vehicle present in the imaging area AR1 with high accuracy in accordance with the environment at the time of imaging.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present invention. Components in the above-described embodiments may be combined freely within a range not departing from the spirit of the invention.

INDUSTRIAL APPLICABILITY

The present disclosure is useful as a camera device and an image processing method that adaptively adjust determination processing of a color of a subject on a captured image in accordance with setting of an image quality parameter and improve extraction accuracy of attribute information related to the color of the subject on the captured image.

What is claimed is:

1. A camera device, comprising:
a lens, an image sensor, and a processor configured to capture an image of an imaging area in which a subject is present;
a memory configured to store a camera parameter related to the image;
an artificial intelligence (AI) processor configured to detect the subject from the image;
the AI processor further configured to primarily determine a color of a target portion of the subject;
the AI processor further configured to adjust a determination result of a predetermined color corresponding to the target portion of the subject, based on the camera parameter related to the image, when the color of the target portion is the predetermined color having a plurality of gradations; and
a communication interface circuit configured to transmit an adjustment result of the predetermined color corresponding to the target portion in association with information on the target portion to an external device.

2. The camera device according to claim 1, wherein the AI processor is configured to primarily determine the color of the target portion of the subject every time the subject is detected.

3. The camera device according to claim 1, wherein
the AI processor is further configured to generate a cut-out image obtained by cutting out the subject from the captured image, and
the communication interface circuit is configured to transmit the adjustment result of the predetermined color corresponding to the target portion, the information on the target portion, and the cut-out image to the external device in association with each other.

4. The camera device according to claim 1, wherein the memory is configured to store a color determination table in which a classification ratio to classification colors corresponding to each of the plurality of gradations of the predetermined color primarily determined is defined in accordance with the camera parameter related to the image, and
the AI processor is further is configured to select the color determination table corresponding to the camera parameter related to the image, and adjust the determination result of the predetermined color corresponding to the target portion based on the selected color determination table.

5. The camera device according to claim 1, wherein the camera parameter related to the image is configured to include on or off of a high dynamic range (HDR) and an exposure ratio of the image.

6. The camera device according to claim 1, wherein the AI processor is configured to output a score indicating certainty for each classification label of the color of the target portion as a primary determination result of the color of the target portion by AI processing using a trained model for primarily determining the color of the target portion.

7. The camera device according to claim 1, wherein the target portion includes clothes or hair of a person present in the imaging area, or a vehicle body of a vehicle present in the imaging area.

8. An image processing method executed by a camera device communicably connected to an external device, the image processing method comprising:
capturing an image of an imaging area in which a subject is present;

detecting the subject from the captured image;

primarily determining a color of a target portion of the detected subject;

adjusting a determination result of a predetermined color corresponding to the determined target portion based on a camera parameter related to imaging when the determined color of the target portion is the predetermined color having a plurality of gradations; and transmitting an adjustment result of the predetermined color corresponding to the determined target portion and information on the target portion to the external device in association with each other.

9. A system, comprising:

a processor; and a memory that stores a camera parameter related to a captured image and that includes at least one program which, when executed by the processor, causes the processor to perform operations, the operations including:

generating the captured image of an imaging area in which a subject is present;

detecting the subject from the captured image;

determining a color of a target portion of the subject;

adjusting a determination result of a predetermined color corresponding to the target portion of the subject, based on the camera parameter related to the captured image, when the color of the target portion is the predetermined color having a plurality of gradations; and transmitting an adjustment result of the predetermined color corresponding to the target portion in association with information on the target portion to an external device.

* * * * *